(12) United States Patent
Schmidt

(10) Patent No.: US 8,534,912 B2
(45) Date of Patent: Sep. 17, 2013

(54) APPARATUS FOR DETERMINING AND/OR MONITORING A MEASURED VARIABLE

(75) Inventor: Dieter Schmidt, Nesselwang (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 839 days.

(21) Appl. No.: 12/451,740

(22) PCT Filed: Jun. 4, 2008

(86) PCT No.: PCT/EP2008/056876
§ 371 (c)(1),
(2), (4) Date: Nov. 30, 2009

(87) PCT Pub. No.: WO2008/148776
PCT Pub. Date: Dec. 11, 2008

(65) Prior Publication Data
US 2010/0132457 A1    Jun. 3, 2010

(30) Foreign Application Priority Data

Jun. 6, 2007  (DE) .......................... 10 2007 026 842

(51) Int. Cl.
*G01N 25/34*    (2006.01)
*G01K 1/14*    (2006.01)
*G01K 1/16*    (2006.01)

(52) U.S. Cl.
USPC ............... 374/45; 374/55; 374/208; 374/141; 337/393; 24/305

(58) Field of Classification Search
USPC ................. 374/208, 205–207, 160–162, 100, 374/194–195, 187, 45–52, 55, 16, 141, 143; 116/216
See application file for complete search history.

(56) References Cited

U.S. PATENT DOCUMENTS

| | | | | |
|---|---|---|---|---|
| 3,955,418 A | * | 5/1976 | Hand | 374/102 |
| 4,064,827 A | * | 12/1977 | Darringer et al. | 116/221 |
| 4,129,125 A | * | 12/1978 | Lester et al. | 600/484 |
| 4,782,240 A | * | 11/1988 | Davidson | 307/10.7 |
| 4,806,815 A | * | 2/1989 | Honma | 310/307 |
| 5,076,197 A | * | 12/1991 | Darringer et al. | 116/221 |
| 5,193,912 A | * | 3/1993 | Saunders | 374/179 |
| 5,335,994 A | * | 8/1994 | Weynant | 374/205 |
| 5,440,193 A | * | 8/1995 | Barrett | 310/328 |
| 5,556,204 A | * | 9/1996 | Tamura et al. | 374/161 |
| 5,684,448 A | * | 11/1997 | Jacobsen et al. | 337/140 |
| 5,928,803 A | * | 7/1999 | Yasuda | 374/101 |
| 6,227,703 B1 | | 5/2001 | DiMatteo | |
| 6,711,024 B1 | | 3/2004 | Johansson | |
| 6,764,441 B2 | * | 7/2004 | Chiel et al. | 600/115 |

(Continued)

FOREIGN PATENT DOCUMENTS

| DE | 202 16 024 | 2/2003 |
|---|---|---|
| DE | 10 2004 003 500 | 6/2005 |

(Continued)

*Primary Examiner* — Gail Verbitsky
(74) *Attorney, Agent, or Firm* — Bacon & Thomas, PLLC

(57) ABSTRACT

An apparatus for determining and/or monitoring at least one measured variable. The apparatus includes: at least one measuring unit; and at least one securement unit for holding the measuring unit in contact with an object. The securement unit is embodied in such a manner, that the securement unit has at least two stable shape states, wherein, for transition between the at least two states, application of a mechanical force to the securement unit is required.

18 Claims, 4 Drawing Sheets

(56) References Cited

U.S. PATENT DOCUMENTS

| | | | |
|---|---|---|---|
| 6,837,620 B2* | 1/2005 | Shahinpoor | 374/205 |
| 7,220,051 B2* | 5/2007 | Shahinpoor | 374/205 |
| 7,374,336 B2* | 5/2008 | Fraden | 374/208 |
| 7,785,266 B2* | 8/2010 | Fraden | 600/549 |
| 8,061,294 B2* | 11/2011 | Suda et al. | 116/216 |
| 8,162,539 B2* | 4/2012 | Mau et al. | 374/170 |
| 8,191,792 B2* | 6/2012 | Bandoh | 236/1 C |
| 8,206,032 B2* | 6/2012 | Wakabayashi | 374/208 |
| 2004/0028118 A1* | 2/2004 | Sidoni | 374/208 |
| 2004/0099175 A1* | 5/2004 | Perrot et al. | 104/138.1 |
| 2005/0094703 A1* | 5/2005 | McConnell et al. | 374/101 |
| 2005/0276309 A1* | 12/2005 | Koch | 374/208 |
| 2006/0273876 A1* | 12/2006 | Pachla et al. | 337/140 |
| 2006/0274814 A1* | 12/2006 | Wang | 374/208 |
| 2007/0053407 A1* | 3/2007 | Kinsler | 374/208 |
| 2008/0191673 A1* | 8/2008 | Kimura | 323/280 |
| 2010/0208768 A1* | 8/2010 | Lakner et al. | 374/206 |
| 2013/0097847 A1* | 4/2013 | Kirkwood et al. | 29/525.05 |

FOREIGN PATENT DOCUMENTS

| | | |
|---|---|---|
| DE | 602 04 398 | 3/2006 |
| DE | 10 2005 051 336 | 5/2007 |
| EP | 1 094 267 | 4/2001 |
| FR | 2590468 A * | 5/1987 |
| GB | 2470083 A * | 11/2010 |
| JP | 60176123 A * | 9/1985 |
| JP | 61189426 A * | 8/1986 |
| JP | 61239126 A * | 10/1986 |
| JP | 62288538 A * | 12/1987 |
| JP | 04333250 A * | 11/1992 |
| JP | 2006 270585 | 10/2006 |
| WO | WO 03/079895 | 10/2003 |

\* cited by examiner

APPARATUS FOR DETERMINING AND/OR MONITORING A MEASURED VARIABLE

TECHNICAL FIELD

The invention relates to an apparatus for determining and/or monitoring at least one measured variable. The apparatus includes: At least one measuring unit; and at least one securement unit for holding the measuring unit in contact with an object. The measured variable is, for example, temperature, flow, pressure, density, viscosity, conductivity, pH value or the pulse or blood pressure. The object is, in such case, for example, a tank or a pipe or a similar containment of process and automation technology or, for example, an extremity.

BACKGROUND DISCUSSION

A problem in measuring or monitoring measured variables is, most often, how to apply the measuring device or the measuring unit at the measuring location. Occasionally, it is required for the measuring, that the measuring unit be placed in direct contact with the object, a variable of which is to be ascertained or monitored. To be distinguished, in such case, is between a lasting securement and a temporary one. Furthermore, there are methods, which are differently complex. Known, for example, are clamping bands, handcuffs, screwed connections and welded connections.

SUMMARY OF THE INVENTION

An object of the invention is to provide a measuring device permitting simple and fast securement to an object.

The object is achieved according to the invention by embodying the securement unit in such a manner, that the securement unit has at least two stable, shape states. The securement unit has, thus, two different, stable and/or static, shape states, wherein especially one shape state serves for securing the measuring unit to the object. If the object of concern is a pipe, then the measuring device of the invention can also be referred to as "pipe attachment sensor with rapid securement"—in such case, thus, the measuring unit is understood to involve a sensor. Especially, the two states differ from one another as regards their geometry. Especially, one shape state is of such a type, that a holding to the object function is assumed by the apparatus of the invention. The object is, in an embodiment, especially, the measurement object, a measured variable of which is to be ascertained and/or monitored.

The object is achieved according to the invention by embodying the securement unit in such manner, that the securement unit has at least two stable, shape states. The securement unit has, thus, two different, stable and/or static, shape states, wherein especially one shape state serves for securing the measuring unit to the object. If the object of concern is a pipe, then the measuring device of the invention can also be referred to as "pipe attachment sensor with rapid securement"—in such case, thus, the measuring unit is understood to involve a sensor. Especially, the two states differ from one another as regards their geometry. Especially, one shape state is of such a type, that a holding to the object function is assumed by the apparatus of the invention. The object is, in an embodiment, especially, the measurement object, a measured variable of which is to be ascertained and/or monitored.

An embodiment provides that, for transition between the at least two states, application of a mechanical force to the securement unit is required. In an alternative embodiment, transition between the two states happens through the application of heat.

An embodiment includes that the securement unit is embodied and matched to the object in such a manner, that the securement unit provides in one shape state a holding force against the object, which is greater than the weight of the securement unit and the measuring unit. The securement unit acts in this embodiment, thus, in one shape state in such a manner with a force of against the object such that a sliding off or falling off from the object is prevented.

An embodiment provides that transition between the at least two stable shape states is reversible. If it is possible, thus, to change between the two static or stable shape states, then a mounting, or demounting, of the measuring device is simple to perform. In an embodiment, toggling between the two states takes place, in each case, through the application of a mechanical force.

An embodiment includes that the at least two stable shape states differ from one another at least as regards their mechanical prestress. In an embodiment, in such case, the mechanical prestress is at least with respect to an imaginary axis or a symmetry axis of the securement unit. If this prestress is overcome through the application of a mechanical force, then the securement unit transfers into the other shape state.

An embodiment provides that the securement unit has at least two imaginary axes, and that the securement unit is embodied in such a manner, that the securement unit has, in the at least two stable shape states, at least along one of the at least two imaginary axes, in each case, another curvature.

An embodiment is of such type, that the at least two imaginary axes are oriented essentially perpendicularly relative to one another.

An embodiment includes that the securement unit is embodied in such a manner, that the securement unit in one of the at least two stable shape states is planar along one of the at least two imaginary axes and convex or concave along the axis in the other of the at least two stable shape states.

An embodiment provides that the securement unit is embodied in such a manner, that the securement unit in one of the at least two stable shape states is concave along one of the at least two imaginary axes and convex in the other of the at least two stable shape states along the axis.

An embodiment includes that the securement unit is composed partially of a mechanically resilient material.

An embodiment is of such type, that the securement unit is composed partially of a shape memory material. For the transition between the two states, thus, the material "springs" back into its previous shape.

An embodiment provides that the securement unit is composed partially of resilient steel.

An embodiment includes that the securement unit is embodied essentially in the form of an elongated strip. The length of the strip is, in such case, calibrated in such a manner with the holding force of a shape state for securement of the measuring device to the object that the clamping function is given at a predeterminable band width of diameters of the object.

An embodiment provides that the securement unit is embodied essentially in the form two elongated strips, which cross at an angle.

An embodiment includes that in one shape state the securement unit has essentially the form of a gutter. The securement unit is, thus, as referenced to a longitudinal axis, concave in one state shape.

An embodiment provides that in one shape state the securement unit has essentially the form of a ring.

An embodiment includes that in one shape state the securement unit has essentially the form of a spiral.

An embodiment provides that the securement unit is embodied essentially in the manner of a snap arm band.

An embodiment includes that the securement unit is provided partially with a slip preventing coating. The slip preventing coating is, in such case, applied in one embodiment on the side of the securement unit facing the object and increases, thus, the holding force of the securement unit to the object.

An embodiment provides that the securement unit is provided partially with a thermally insulating coating.

An embodiment is of a type such that the securement unit is provided partially with an oscillation damping coating.

An embodiment includes that the object is a pipe or a tank.

An embodiment provides that the object is a human or animal extremity.

An embodiment includes that the measuring unit is a measuring device of process and automation technology.

An embodiment provides that the measuring unit is a temperature measuring device, and that the measured variable is temperature. In this embodiment, the securement unit has a lowest possible thermal mass. The securement unit is, for example, very thin.

An embodiment includes that the measuring unit is an ultrasonic measuring system, and that the measured variable is the flow of a medium through the object.

An embodiment provides that the measuring unit is an acceleration sensor, and that the measured variable is mechanical oscillations.

An embodiment includes that the measuring unit is a microphone, and the measured variable is body sound of the object.

An embodiment provides that the measuring unit is an optical measuring system, and the measured variable is color or surface morphology.

An embodiment includes that the measured variable is the pulse or blood pressure.

The above noted embodiments can also be used especially for an apparatus for sending and/or determining and/or monitoring a measured or process variable. The apparatus includes therefor a transmitting and/or receiving unit for sending or receiving data. Especially, measurement data are sent therewith. In such case, the transmitting unit is, for example, an RFID tag or a Bluetooth unit or some another unit for sending, for example, electromagnetic signals. In an embodiment, thus, besides the measuring unit, also such a transmitting unit is present.

An embodiment provides that the measuring unit is an integral component of the securement unit. In this embodiment, thus, the measuring unit is integrated into the securement and is a component of it.

An embodiment includes that the measuring unit is embodied in such a manner, that the measuring unit at least partially changes its color as a function of the measured variable. The measuring unit concerns in this embodiment, thus, that a series of substances change their colors as a function of, for example, temperature, moisture, pH value or pressure. This can be used, thus, purely for display, however, also for measuring the measured variable.

An embodiment provides that the measuring unit comprises a thermochromatic substance. Located in the measuring unit is, thus, at least one substance, which changes its color, or assumes a particular color or coloring, as a function of the reigning temperature.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
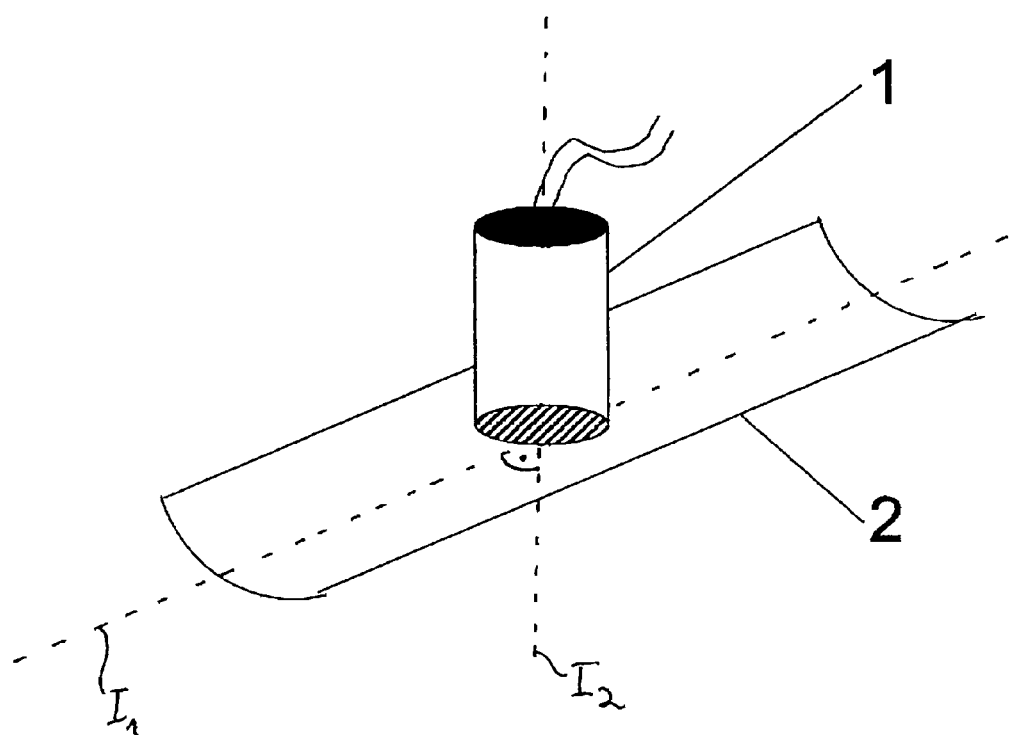
FIG. 1 is a three dimensional representation of the measuring device of the invention, wherein the securement unit is in a first shape state.
Figure 2:
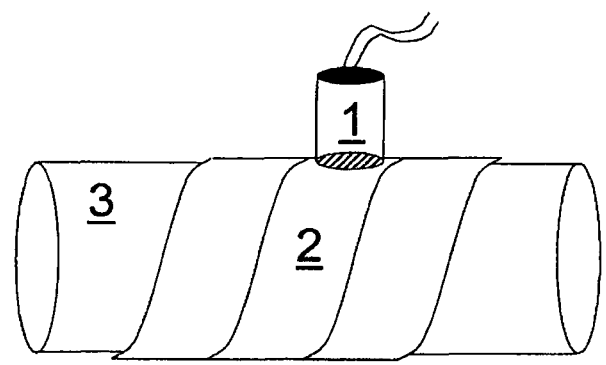
FIG. 2 is the measuring device of FIG. 1, wherein the securement unit is in a second shape state and secured on a pipe.

FIGS. 1 and 2 show the measuring device of the invention in a first variant. In the case of the securement unit 2—another name for it would be "rapid clamping spring"—such involves an elongated strip, which is composed, for example, basically of a resilient piece of metal. Applied to one side of the securement unit 2 is the measuring unit 1, thus the actual measuring sensor. This is here contacted, for example, via two lines, in order to supply it with energy, in order to drive it suitably for the measurements or in order to collect the measurement signal. The measuring unit/sensor 1 is, in such case, affixed to (welded, adhered, crimped, thermally shrunk, or the like), or releasably connected with (e.g. per stop and passageway, per bayonet connection, pushed flat under the spring, or the like), the securement unit 2, which can also be referred to as the holding spring. The other side of the securement unit 2 effects the affixing to the object 3.

FIG. 1 shows the apparatus of the invention in a state, in which the securement unit 2 is in a first shape state. The securement unit 2 has, in such case, two imaginary axes. The one axis is the longitudinal axis, along which the securement unit 2 also has its greatest extent. Perpendicularly thereto, and, for example, located in the middle, is the second imaginary axis. In this first shape state, the securement unit 2 is along the longitudinal axis, referenced to the side facing the object, curved concavely. Along the imaginary axis perpendicular thereto, the securement unit 2 is planar, or slightly concavely curved.

FIG. 2 shows the case of securement, in which the securement unit 2 is in the second shape state and here curves around a pipe as object 3. In this embodiment, the securement unit 2 is curved around the second, central axis and curves, thus, around the pipe 3. At the same time, the securement unit 2 is flat or planar along the first axis. This shape state can also be referred to as the end, or resting, state.

For transition between these two states, application of a mechanical force is required, through which the prestress along the one axis or direction is overcome and through which the securement unit 2 transfers into its second shape state.

The application of the measuring unit/sensor 1 in a mounting spring, which, here, is the securement unit 2, is comparable to known "snap arm bands". The entire arrangement can be mounted, e.g. on the pipe 3, or removed therefrom, completely without tools. Thus, the arrangement is suited not only for continuous, but, also for temporary registering of measured values.

The securement unit 2 illustrated in FIGS. 1 and 2 is an elongated strip, whose part essential for the securement is here, for example, spring steel. Alternatively, also non-metallic materials, e.g. synthetic materials, or plastics, can be used. Characteristically, here, a prestressed stable starting shape (e.g. a gutter in longitudinal direction) is produced as a first state shape by mechanical forming. Under application of corresponding reversion forces, this can be essentially completely reversibly transformed into a stable, second shape state—here a ring, or spiral shaped state. In the case of the transition into the second shape state, it helps, that the securement unit 2 attempts to assume a stress free state, wherein it wraps with circular, or spiral, shape around the object—here a pipe 3, alternatively an extremity or a joint. The securement unit 2 can comprise, for example, a plastic shell around a core of resilient material.

In the mounting, the securement unit 2 wraps partially or with spiral shape around the pipe 3 and affixes the sensor 1 with a defined force onto the tube wall. In the case, in which temperature is measured, thus, simultaneously also the thermal contact is produced. In the longitudinal direction of the leaf spring 2, there holds, in such case, in the static state, the cable friction equation:

$$F_{S1}=F_{S2}*e^{\mu a}$$

In such case, $F_{S1}$, and $F_{S2}$ are the forces on the ends of the securement unit 2 here embodied as a leaf spring, $\mu$ is the cable friction constant, or the friction between tube, or pipe, wall and the bearing surface of the spring 2 and $\alpha$ is the contact angle (in radians).

As a function of the length of the spring 2 and the material pairing of spring and tube, or pipe, wall, a better affixing of the arrangement is achieved, the larger the contact angle, or length, of the spring 2 is.

For the case of temperature as measured variable, in order to obtain rapidly responding temperature measuring points, preferably sensors 1 are used having sensors soldered in the floor of a shell, or sensors 1 lying directly/planarly on the tube wall. Alternatively, also an appropriately shaped primary sensor without surrounding housing (e.g. thin film Pt100) can be directly contacted to the tube wall by use of the spring 2.

The advantages the invention are, thus: Fast securement and disassembly of a measuring point, wherein this can be done without additional tools. A cost effective manufacture of a holder for the sensors can be achieved through the use of the spring. One spring embodiment can be used for different nominal diameters/contours of the object. Inventory costs are reduced. Through the embodiment of the securement unit, a good coupling between tube, or pipe, wall and sensor 1 is given. This is, for example, very advantageous in the case of temperature measurement. Furthermore, it is a very robust securement technology. If, moreover, the securement is insulated or coated, then both mounting of the measuring unit and insulation of the measuring point are achieved at the same time.

Figure 3:
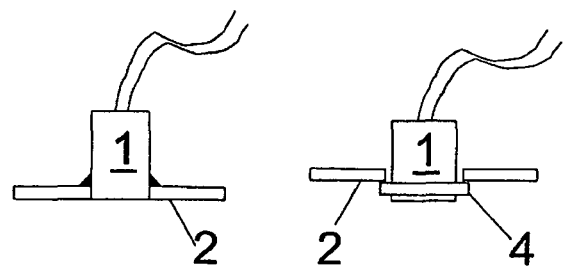
FIG. 3a), FIG. 3b) and FIG. 3c) are three variants of the region between measuring unit and securement unit.
Figure 3:
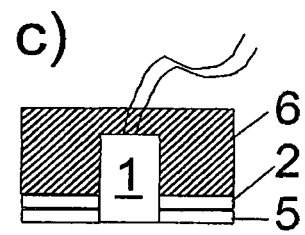

FIGS. 3a), b) and c) show three special embodiments of the interface between measuring unit 1 and securement unit 2. The securement unit 2 can, in such case, in each case, be planar or untensioned.

In FIG. 3a), the measuring unit 1 is introduced into a traversing bore in the securement unit 2, so that the measuring unit 1 with its sensitive sensor surface directly contacts the object. The measuring unit 1 is, in such case, connected with the securement unit 2, for example, by welding, adhesive or mechanical clamping.

In FIG. 3b), in extension of the variant of FIG. 3a), a stop 4 is provided on the measuring unit 1.

A marked extension is represented by FIG. 3c) by providing on the lower side facing the object a slip hindering, or damping, or insulating layer 5. Alternatively thereto, the securement unit 2 is embodied in such a manner, that its lower side has a high coefficient of friction. On the upper side, the measuring unit 1 is embedded in an insulation 6. If the process variable is temperature, then the insulation 6 lessens the heat radiation to the surrounding atmosphere, whereby the measuring of temperature is markedly improved.

In an additional variant (not shown), the securement unit 2 is composed of thin struts ("spiderweb"), so that thermal, heat transfer effects are further minimized.

Figure 4:
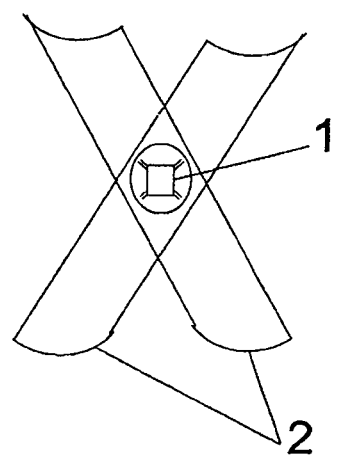
FIG. 4 is a second variant of the measuring device of the invention.

FIG. 4 shows another variant, in which the securement unit 2 is composed of here two—in an alternative variant, a plurality of—struts or strips arranged on top of one another, preferably at an angle relative to one another, whereby the contact force is improved and—in the case of insulated struts or springs—the thermal properties are further improved by angled covering of the arising gaps.

The invention claimed is:

1. An apparatus for determining and/or monitoring at least one measured variable of an object, comprising:
   at least one measuring unit; and
   at least one securement unit for holding said at least one measuring unit in contact with the object; wherein:
   said at least one securement unit is embodied essentially in the form of an elongated strip;
   said at least one securement unit has at least two stable, shape states wherein each shape states characterized by a different or another curvature;
   said at least one securement unit has at least two imaginary axes, which are oriented essentially perpendicularly relative to one another;
   wherein one of the imaginary axes is the longitudinal axis along which the at least one securement unit has its greatest extent, and
   said at least one securement unit has in the at least two stable shape states, at least along one of said at least two imaginary axes, in each of the at least two stable shape states, different or another curvature.

2. The apparatus as claimed in claim 1, wherein:
   application of a mechanical force to said at least one securement unit is required for transition between said at least two states.

3. The apparatus as claimed in claim 1, wherein:
   said at least one securement unit in one shape state provides a holding force against the object, which is greater than the weight of said at least one securement unit and said at least one measuring unit.

4. The apparatus as claimed in claim 1, wherein:
   said at least two stable shape states differ from one another at least as regards mechanical prestress.

5. The apparatus as claimed in claim 1, wherein:
   said at least one securement unit in one of said at least two stable shape states along one of said at least two imaginary axes is planar and convex or concave in the other of said at least two stable shape states along the axis.

6. The apparatus as claimed in claim 1, wherein:
   said at least one securement unit in one of said at least two stable shape states along one of said at least two imaginary axes is concave and convex in the other of said at least two stable shape states along the axis.

7. The apparatus as claimed in claim 1, wherein:
   said at least one securement unit is composed partially of a shape memory material.

8. The apparatus as claimed in claim 1, wherein:
   said at least one securement unit is composed partially of a mechanically resilient material.

9. The apparatus as claimed in claim 8, wherein:
   said at least one securement unit is composed partially of resilient steel.

10. The apparatus as claimed in claim 1, wherein:
    securement unit is embodied essentially in the form of two elongated strips, which cross one another at an angle.

11. The apparatus as claimed in claim 1, wherein:
in one shape state said at least one securement unit has essentially the form of a gutter.

12. The apparatus as claimed in claim 1, wherein:
in one shape state said at least one securement unit has essentially the form of a ring.

13. The apparatus as claimed in claim 1, wherein:
in one shape state said at least one securement unit has essentially the form of a spiral.

14. The apparatus as claimed in claim 1, wherein:
said at least one securement unit is embodied essentially as a snap arm band.

15. The apparatus as claimed in claim 1, wherein:
said at least one securement unit is provided partially with a slip preventing coating, and/or said at least one securement unit is provided partially with a thermally insulating coating, and/or said at least one securement unit is provided partially with an oscillation damping coating.

16. The apparatus as claimed in claim 1, wherein:
said at least one measuring unit is an integral component of said at least one securement unit.

17. The apparatus as claimed in claim 1, wherein:
said at least one measuring unit at least partially changes its color as a function of the measured variable.

18. The apparatus as claimed in claim 17, wherein:
said at least one measuring unit comprises at least partially a thermochromatic substance.

\* \* \* \* \*